Sept. 17, 1968        I. BUCK        3,401,408

CHAMBER POT

Filed Oct. 9, 1963        2 Sheets-Sheet 1

Inventor
Immanuel Buck by Michael J. Striker

United States Patent Office 3,401,408
Patented Sept. 17, 1968

3,401,408
CHAMBER POT
Immanuel Buck, Justinus-Kerner-Weg 9, Fellbach, near Stuttgart, Germany
Filed Oct. 9, 1963, Ser. No. 314,975
16 Claims. (Cl. 4—141)

ABSTRACT OF THE DISCLOSURE

A chamber pot which defines an internal cavity with an opening at the upper end. The bottom wall of the chamber pot is uneven and its front portion has a depression for reception of liquid matter. The rear portion of the bottom wall is located above the bottom zone of the depression and serves to intercept and support solid matter.

---

The present invention relates to an improved chamber pot which is intended for use by small children.

In contrast to nearly all other types of sanitary equipment, chamber pots have changed very little—if at all—from the time they were first discovered despite the fact that conventional chamber pots exhibit a number of serious drawbacks. Thus, a conventional chamber pot does not have a pronounced front section or rear section, it is normally a low structure of round shape and with a circular wall which does not extend higher than 140 mm. above the ground, and its seat is narrow (having a width of one inch or even less) and thus very uncomfortable. Furthermore, a conventional chamber pot is easy to overturn, it is easy to slide along the ground, and the rump as well as the genital organs of a child are likely to be splashed with urine in response to discharge of solid matter onto the flat bottom walls of such pots.

Accordingly, it is an important object of the present invention to provide an improved chamber pot for children which is constructed and assembled in such a way that it provides a very comfortable seating facility for the user and that it is hard to overturn, to drag along the ground and/or to soil the exposed part of the rump.

Another object of the invention is to provide a chamber pot of the just outlined characteristics which prevents the rump and the genital organs of a child from coming into contact with its contents, whose interior is observable from a reasonable distance by mothers, nurses and other persons in charge while the child is in the process of using the pot, which is constructed with a view to avoid deformation of bone structure, and whose configuration is such that the exposed parts of the body of a child are not likely to be splashed in response to discharge of liquid matter and/or of solid matter into such liquid matter.

An additional object of the invention is to provide a chamber pot which need not be provided with a pronounced handle or wherein the handle may simultaneously serve to perform another function, wherein the solid fraction of its contents need not come into contact with the liquid fraction so that each fraction may be inspected separately by a physician or another competent person, and which is very easy to clean because the solid fraction of its contents need not come into actual contact with the material of the pot.

A further object of the invention is to provide a sanitary liner which may be used in a chamber pot of the above outlined characteristics.

A concomitant object of the invention is to provide a method of evacuating the contents of a chamber pot which exihibits the above outlined characteristics.

With the above objects in view, one feature of my invention resides in the provision of a chamber pot at least a portion of which preferably consist of transparent or translucent vitreous or synthetic plastic material to permit observation of its contents from a reasonable distance when the pot is in actual use. The pot comprises an uneven bottom wall which includes a front portion defining a depression for reception of liquid matter and a rear portion which is located at a level above the front portion and which serves to support solid matter so that such solid matter cannot splash the liquid against the exposed part of the rump and against the genital organs of a child.

In accordance with another feature of my invention, the side walls of the pot have upper portions which define an elongated narrow opening extending from the front end toward the rear end of the pot, and such upper portions extend outwardly from this opening to form a comfortable seat whose width is preferably in the range of two, three, four or more inches. The seat is preferably located at a distance of at least seven inches above the ground to insure that the child is not likely to become tired while the rump rests on the seat even if the child is left on the pot for considerable periods of time.

The pot is preferably mounted on several legs including a front leg which may serve as handle to permit evacuation of the contents over the rear wall of the pot.

The novel features which are considered as characteristic of the invention are set forth in particular in the appended claims. The improved chamber pot itself, however, both as to its construction and the method of using the same, together with additional features and advantages thereof, will be best understood from the following detailed description of certain specific embodiments with reference to the accompanying drawings, in which:

Figure 1:
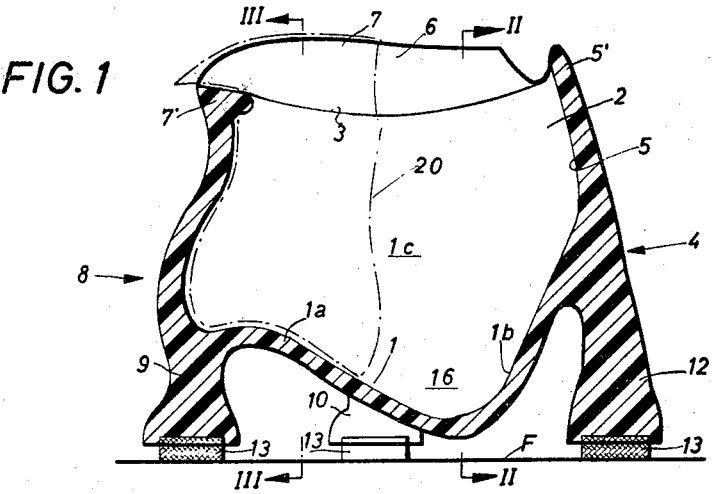
FIG. 1 is a central vertical section taken lengthwise through a chamber pot which embodies one form of my invention.
Figure 2:
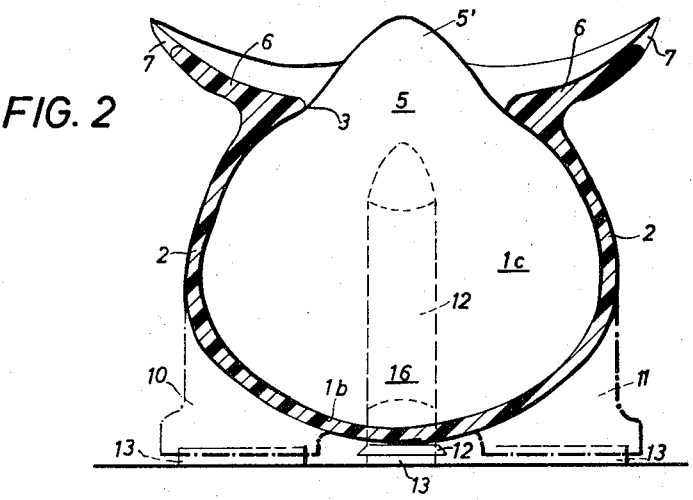
FIG. 2 is a transverse vertical section as seen in the direction of arrows from the line II—II of FIG. 1, showing the interior of the liquids-receiving front section of the chamber pot.

Referring to the drawings, and first to FIG. 1, there is shown a chamber pot which preferably consists of transparent or translucent material, such as a vitreous or synthetic plastic substance. This enables the mother, the nurse or another person in charge to determine from a reasonable distance whether or not the child has started or is in the process of discharging solid and/or liquid matter. The pot comprises an uneven bottom wall 1 which is spaced from the floor F or from another support on which the pot is placed and which includes a raised rear portion 1a forming a substantially horizontal platform with gradual transition in the middle of the bottom wall into a concave pan-shaped front portion 1b which latter is located at a lower level (nearer to the floor) and defines a concave depression 16 forming the lowermost zone of the cavity 1c. The pot further comprises two upwardly extending concave side walls 2 which are integral with the bottom wall 1 and whose upper portions extend inwardly (i.e., toward each other) to define a comparatively narrow elongated opening 3 whose width is substantially less than the maximum distance between the side walls, see FIGS. 2 to 4. In other words, the bottom wall 1 and the side walls 2 together form a bulgy structure which, in the view of FIG. 2, is bounded by a concave internal surface and whose opening 3 extends at both sides of the longitudinal symmetry plane of the pot, this symmetry plane corresponding to the plane of FIG. 1. The width of the opening 3 decreases in a direction toward the concave front wall 4 of the pot, see FIG. 4. This front wall 4 defines at its inner side an elongated channel 5 which is inclined downwardly and rearwardly and which leads urine into the depression 16. The upper portion 5' of the front wall 4 extends gently upwardly and rearwardly and is located at a level above the level of the opening 3 so that the internal surface of the front wall 4 forms an effective barrier against splashing of urine upwardly and toward the torso of the person using the pot.

Figure 3:
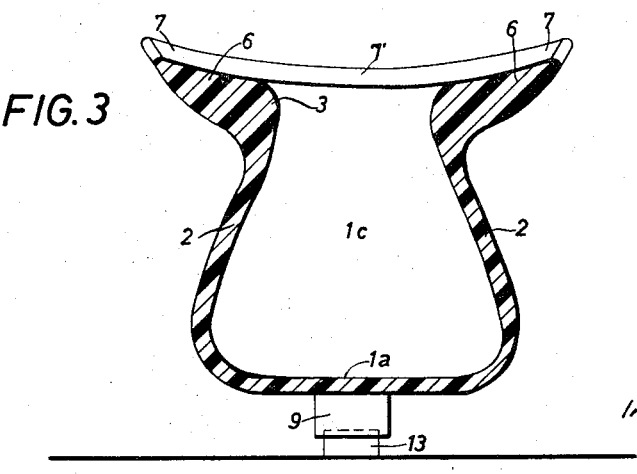
FIG. 3 is a transverse vertical section as seen in the direction of arrows from the line III—III of FIG. 1, showing the interior of the solids-receiving rear section of the chamber pot.
Figure 4:
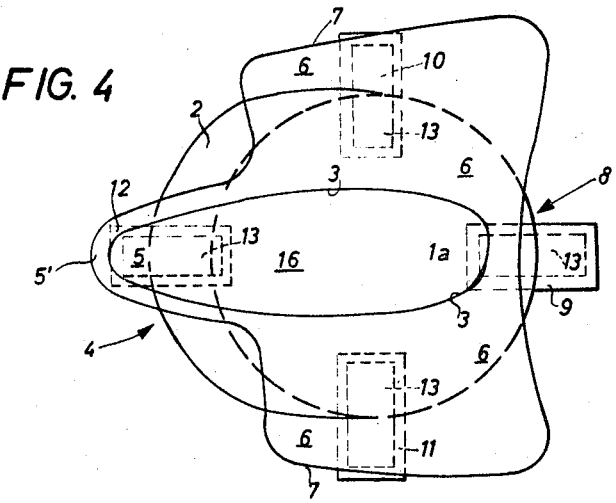
FIG. 4 is a top plan view of the chamber pot.

The upper portions of the side walls 2 form two spaced seating facilities in the form of spaced shells 6 of considerable width whose configuration is shown in FIGS. 2 to 4 and which terminate short of the front wall 5 so that a child whose rump rests on the concave upper sides of the shells may assume a very comfortable position without undue spreading of the legs. The upper portion 5' of the front wall 4 is without a strongly pronounced flange so that it does not necessitate excessive spreading of the legs such as would cause discomfort after comparatively short periods of use. The outer edges 7 of the shells 6 are bent upwardly (see FIGS. 2 and 3) to prevent lateral shifting of the rump.

The concave rear wall 8 of the pot forms an arcuate transition between the rear portions of the side walls 2 and the bottom wall 1, and its upper portion 7' forms an arcuate connecting flange between the shells 6. The upper side of the portion 7' is of concave shape to prevent shifting of the rump in rearward direction. It will be noted that the shells 6 with their outer portions 7 and the upper portion 7' of the rear wall 8 together form a contoured seat which conforms to the outlines of the rump and which prevents shifting of the buttocks in all directions excepting forwardly where the shells 6 terminate short of the upper portion 5' of the front wall 4. The width of the portion 7' may be substantially less than the width of the shells 6.

The pot further comprises four symmetrically distributed ground contacting legs including two lateral legs 10, 11, a front leg 12 which is outwardly adjacent to the portion 1b, and a rear leg 9. The legs maintain the bottom wall at a distance from the surface of the floor F and the underside of each leg carries a friction pad 13 which may consist of rubber or another yieldable antiskid material. These pads may be recessed into and are preferably bonded or otherwise secured to the undersides of the respective legs. The lowermost ends of some or all of the legs are enlarged and extend outwardly to provide a very stable support for the actual pot which will thus resist tilting if the child leans forwardly, rearwardly or sidewise from its normal seated position. It goes without saying that the number of legs may be reduced or increased above four without departing from the spirit of my invention. The legs 9, 12 are located in the longitudinal symmetry plane of the pot.

In accordance with the feature of my invention, the seat 6, 7, 7' is preferably located at a distance of at least 175 mm. (seven inches) above the floor which is substantially more than in conventional chamber pots of which I have knowledge at this time. Consequently, a child in sitting posture on the shells 6 need not crouch or squat and will not tire as easily as on a conventional pot. Thus, instead of tiring after a few minutes of sitting, a small child may be left on the pot of my invention for longer periods of time and requires less supervision because the improved seat prevents the child from leaving the pot as well as from falling forwardly, laterally or rearwardly. Of course, the seat should not be too high, i.e., a pot whose shells 6 are at a distance of about 7-9 inches from the ground will be quite satisfactory.

When the pot of my invention is in actual use, urine will flow down the channel 5 and will accumulate in the depression 16. Solid matter will drop onto the platform 1a and normally need not descend into the depression 16 to thus avoid splashing of urine against the rump and against the genital organs of the child. If desired, at least the internal surface of the rear wall 8, the rear portions of the side walls 2, and the platform 1a may be coated with a specially configured liner 20 of paper or similar absorbent material which exceeds along the upper sides of the shells 6 and along the upper side of the flange 7' so that it is clamped between the pot and the bottocks to remain in requisite position and to prevent direct contact between the internal surface of the pot and the solid matter. The material of the liner 20 may be such that it disintegrates by contact with liquids so that it may be discharged into the bowl of a water closet and may be flushed down without any danger of clogging the piping. This liner may assume the form of a bag which coats the entire internal surface of the pot and the upper side of the seat.

In evacuating the contents of the pot, the person in charge may use the front leg 12 as a handle and thereupon tilts the pot in such a way that the contents are evacuated over the flange 7'. In other words, in contrast to conventional pots which are often completely round, the pot of my invention has a pronounced front and rear section to make sure that its contents may be evacuated at the rear end. This is of considerable importance if the person in charge happens to be negligent and fails to properly clean the pot after each use. Were the pot emptied over the upper edge of its front section, remnants of its contents could adhere to the internal surface of the front wall to come into contact with highly sensitive genital organs of the child during subsequent uses. This danger is obviously more pronounced when the pot is used by a male child. If the pot is used with a liner, the solid matter will be prevented from coming into actual contact with the internal surface which surrounds the cavity 1c. Splashing of urine is further reduced by the concaveness of the surface which surrounds the cavity 1c. This surface extends outwardly and downwardly from the opening 3 in contrast to conventional pots whose cavity is bounded by a vertical surface.

Owing to the provision of friction generating pads 13, the child is prevented from dragging the pot along the floor to reach the leg of the nearest table, chair or another piece of furniture which could serve as a support enabling the child to rise from the seat 6, 7'. The purpose of the comparatively narrow opening 3 is to prevent the rump from sliding into the cavity 1c and from coming into contact with its contents. Furthermore, this narrow opening may be completely sealed by the rump to prevent escape of noxious odors and to prevent the child from reaching with fingers into the cavity 1c. Still further, by being prevented from sliding into the cavity 1c, the rump cannot become clamped in the pot and the child may be lifted without any danger that the pot would be lifted by suction.

I wish to mention here that, as a rule, doctors advise mothers not to keep children on a pot for periods exceeding five minutes because the narrow annular seating facilitiy of a conventional chamber pot will cause rapid tiredness which will be felt in the knees and in the thighs of a child, especially if the seating facility is located close to the floor. In fact, the bone structure of a child using such a low pot for extended periods of time may undergo permanent deformation, particularly the pelvic region, which might have far reaching consequences in the development of a female child.

The cavity 1c is preferably configurated with a view to avoid the formation of dead corners which would result in accumulation of impurities and which would serve as a hotbed for bacteria.

Figure 5:
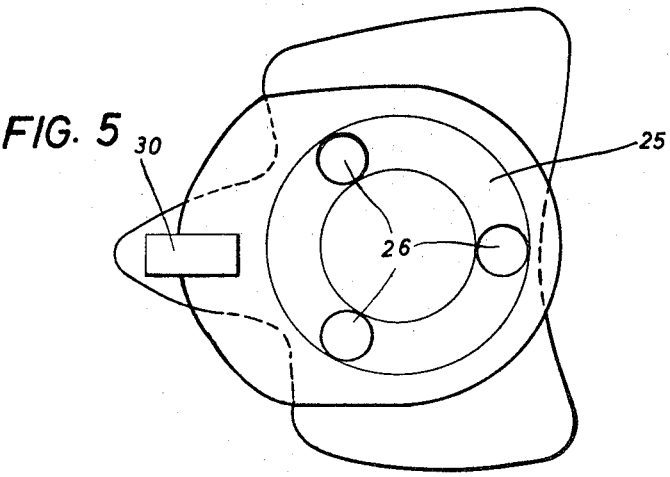
FIG. 5 is a bottom plan view of a modified chamber pot which is provided with a single ground contacting leg of annular shape.

The pot of FIG. 5 is shown in bottom plan view to illustrate a single ground contacting leg 25 of annular shape which is rigid with the underside of the bottom wall and which is provided with one or more friction pads 26. This pot is provided with a handle 30 which is located at the front end, i.e., at the outer side of the front wall.

Figure 6:
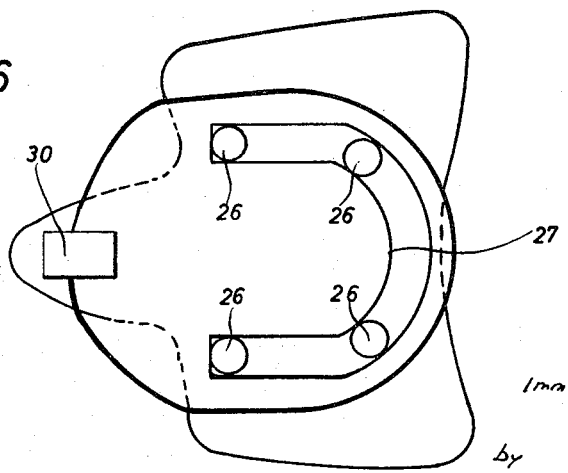
FIG. 6 is a bottom plan view of a third chamber pot which is provided with a single ground contacting leg of horseshoe shape.

The chamber pot of FIG. 6 comprises a single leg 27 of horseshoe shape which is integral with or secured to the underside of the bottom wall to replace the legs 9–12 or the leg 25.

The liner 20 mentioned in connection with FIG. 1 may, for example, be pressed of cellulose or cellucotton or may be of a sort of paper such as toilet paper which easily disintegrates by contact with liquids. It also may be formed of cheap cotton threads meshed to a fine network.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A chamber pot comprising a bottom wall; a pair of side walls extending upwardly from said bottom wall and having upper portions forming a seat of substantial width, said upper portions defining between themselves an elongated opening having a front end and a rear end; a front wall extending between said side walls and upwardly from said bottom wall at the front end of said opening; and a rear wall extending between said side walls and upwardly from said bottom wall at the rear end of said opening, said walls defining between themselves a cavity which is accessible through said opening and said bottom wall having a depression which is arranged to receive liquid matter flowing along said front wall and which is located at a level below the front end of said opening.

2. A chamber pot comprising a bottom wall; a pair of side walls extending upwardly from said bottom wall and having upper portions forming a seat of substantial width, said upper portions defining between themselves an elongated opening having a front end and a rear end; a front wall extending between said side walls and upwardly from said bottom wall at the front end of said opening; and a rear wall extending between said side walls and upwardly from said bottom wall at the rear end of said opening, said walls defining between themselves a cavity which is accessible through said opening and said bottom wall having a depression which is arranged to receive liquid matter flowing along said front wall and which is located at a level below the front end of said opening, said front wall defining at its inner side a channel arranged to convey liquid matter and extending downwardly and into said depression.

3. A chamber pot comprising a bottom wall; a pair of side walls extending upwardly from said bottom wall and having upper portions forming a seat of substantial width, said upper portions defining between themselves an elongated opening having a front end and a rear end; a front wall extending between said side walls and upwardly from said bottom wall at the front end of said opening; and a rear wall extending between said side walls and upwardly from said bottom wall at the rear end of said opening, said rear wall having an upper portion forming an outwardly extending flange which connects the upper portions of said side walls so that said upper portions together form a contoured seat for the rump of a user, said walls defining between themselves a cavity which is accessible through said opening and said bottom wall having a depression which is arranged to receive liquid matter flowing along said front wall and which is located at a level below the front end of said opening.

4. A chamber pot comprising a bottom wall; a pair of side walls extending upwardly from said bottom wall and having upper portions forming a seat of substantial width, said upper portions defining between themselves an elongated opening having a front end and a rear end; a front wall extending between said side walls and upwardly from said bottom wall at the front end of said opening, said front wall having an upper portion extending rearwardly and located at a level above the upper portions of said side walls to prevent splashing of liquid matter in upward direction; and a rear wall extending between said side walls and upwardly from said bottom wall at the rear end of said opening, said walls defining between themselves a cavity which is accessible through said opening and said bottom wall having a depression which is arranged to receive liquid matter flowing along said front wall and which is located at a level below the front end of said opening.

5. A chamber pot comprising an uneven bottom wall; a pair of concave side walls extending upwardly from said bottom wall and having upper portions forming a seat of substantial width, said upper portions defining between themselves an elongated narrow opening having a front end and a rear end; a concave front wall extending between said side walls and upwardly from said bottom wall at the front end of said opening; and a concave rear wall extending between said side walls and upwardly from said bottom wall at the rear end of said opening, said walls defining between themselves a cavity which is accessible through said opening and said bottom wall having a depression which is arranged to receive liquid matter flowing along said front wall and which is located at a level below the front end of said opening.

6. A chamber pot consisting at least in part of transparent material and comprising an uneven bottom wall having a front portion defining a depression for reception of liquid matter and a rear portion arranged to support solid matter and located at a level above said front portion to prevent splashing of liquid matter in response to discharge of solid matter; a front wall integral with said bottom wall and extending upwardly from said front portion, said front wall defining a downwardly and rearwardly inclined channel arranged to direct liquid matter into said depression and having an upper portion forming a shield arranged to prevent splashing of liquid matter from the interior of the pot; a pair of side walls integral with said bottom wall and with said front wall and having upper portions located at a level below the upper portion of said front wall, the upper portions of said side walls defining between themselves an elongated opening extending rearwardly from the upper portion of said front wall and the upper portions of said side walls extending outwardly from said opening to form a seat of substantial width whose outer edges extend upwardly to prevent lateral shifting of the rump resting thereon, said seat terminating at the upper portion of said front wall to enable the user to occupy said seat without undue spreading of legs; a rear wall integral with said side walls and with said bottom wall, said rear wall having an upper portion forming a connecting flange between the upper portions of said side walls and thus constituting a portion of said seat so that the seat extends all the way around said side walls and said rear wall; and a plurality of symmetrically distributed legs integral with said walls and each having a ground contacting friction pad, said legs being arranged to support said bottom wall at a distance from the ground and one thereof being located beneath said front wall to serve as a handle and to permit evacuation of the contents over the upper portion of said rear wall, at least some of said legs having outwardly extending lower portions to hold the pot against overturning.

7. A chamber pot consisting at least in part of transparent material and comprising an uneven bottom wall having a front portion defining a depression for reception of liquid matter and a rear portion arranged to support solid matter and located at a level above said front portion to prevent splashing of liquid matter in response to discharge of solid matter; a front wall integral with said bottom wall and extending upwardly from said front portion, said front wall defining a downwardly and rearwardly inclined channel arranged to direct liquid matter into said depression and having an upper portion forming a shield arranged to prevent splashing of liquid matter from the interior of the pot; a pair of side walls integral with said bottom wall and with said front wall and having upper portions located at a level below the upper portion of said front wall, the upper portions of said side walls defining between themselves an elongated opening whose width increases rearwardly from the upper portion of said front wall and the upper portions of said side walls extending outwardly from said opening to form a seat of substantial width whose outer edges extend upwardly to prevent lateral shifting of the rump resting thereon, said seat terminating at the upper portion of said front wall to enable the user to occupy said seat without undue spreading of legs; a rear wall integral with said side walls and with said bottom wall, said rear wall having an upper portion forming a connecting flange between the upper portions of said side walls and thus constituting a portion of said seat so that the seat extends all the way around said side walls and said rearwall; and a plurality of symmetrically distributed legs integral with said walls and each having a ground contacting friction pad, said legs being arranged to support said bottom wall at a distance from the ground and one thereof being located beneath said front wall to serve as a handle and to permit evacuation of the contents over the upper portion of said rear wall, at least some of said legs having outwardly extending lower portions to hold the pot against overturning.

8. As a novel article of manufacture, a chamber pot comprising side wall means defining an internal cavity having a rear portion and a front portion with an opening at its upper end, said side wall means including an upper portion defining a seat which surrounds said opening for supporting the buttocks of the user in a predetermined position with its rear portion located above said rear portion of said cavity and the front portion located above the front portion of said cavity, and an uneven bottom wall downwardly spaced from said opening and said seat and including a front bottom portion located in said front portion of said cavity and defining a depression for reception of liquid matter and a rear bottom portion located in said rear portion of said cavity at a level above said depression and serving to support solid matter.

9. As a novel article of manufacture, a chamber pot comprising side wall means defining an internal cavity having a rear portion and a front portion with an opening at its upper end, said side wall means including an upper portion defining a seat which surrounds said opening for supporting the buttocks of the user in a predetermined position with its rear portion located above said rear portion of said cavity and the front portion located above said front portion of said cavity, and an uneven bottom wall downwardly spaced from said opening and said seat and including a front bottom portion located in said front portion of said cavity and which defines a depression for reception of liquid matter and a rear bottom portion which is located in said rear portion of said cavity at a level above said depression and serves to support solid matter, said pot consisting at least in part of transparent material to permit observation of its contents in actual use.

10. A chamber pot comprising bottom, side and rear walls which define a cavity having a rear portion and a front portion and having an opening at its upper end, said side walls having upper portions extending outwardly from said opening and forming a contoured seat for the buttocks of the user for supporting the buttocks of the user in a predetermined position with its rear portion located above said rear portion of said cavity and the front portion located above said front portion of said cavity, said seat being located at a distance of at least 175 mm. above the ground, and said bottom wall including a rear bottom portion which is located in said rear portion of said cavity adjacent said rear wall and defining a support for solid matter and a front bottom portion located in said front portion of said cavity and spaced from said rear wall and defining a depression located at a level below said rear bottom portion and being adapted to receive liquid matter therewithin.

11. A chamber pot comprising an uneven bottom wall, a front wall and a rear wall together defining a cavity having a rear portion and a front portion, and said bottom wall including a rear bottom portion adjacent said rear wall in said rear portion and defining a support for solid matter and a front bottom portion spaced from said rear wall and defining a depression located in said front portion at a level below said rear bottom portion and being adapted to receive liquid matter therewithin; a pair of side walls having upper portions defining between themselves an opening and extending outwardly from said opening to form a seat for supporting the buttocks of the user in a predetermined position with its rear portion located above said rear portion of said cavity and the front portion located above said front portion of said cavity; and a plurality of ground contacting legs including a front leg located at a level below said front wall and formed as a handle to facilitate evacuation of the contents of the pot over the upper portion of said rear wall.

12. A chamber pot comprising an uneven bottom wall, a front wall, and a rear wall, together defining a cavity having a rear portion and a front portion, and said bottom wall including a rear bottom portion adjacent said rear wall in said rear portion and defining a support for solid matter and a front bottom portion spaced from said rear wall and defining in said front portion a depression located at a level below said rear portion and being adapted to receive liquid matter therewithin; a pair of side walls having upper portions defining between themselves an opening and extending outwardly from said opening to form a seat for supporting the buttocks of the user in a predetermined position with its rear portion located above said rear portion of said cavity and the front portion located above said front portion of said cavity; and a plurality of ground contacting legs having ground contacting pads of friction-generating material for preventing inadvertent sliding of said pot with reference to the ground.

13. As a novel article of manufacture, a chamber pot comprising wall means defining an internal cavity having a rear portion and a front portion with an opening at its upper end, said wall means including an upper portion defining a seat which surrounds said opening for supporting the buttocks of the user in a predetermined position with its rear portion located above said rear portion of said cavity and the front portion located above said front portion of said cavity, and an uneven bottom wall including a front bottom portion located in said front portion of said cavity and defining a depression for reception of liquid matter and a rear bottom portion which is located in said rear portion of said cavity at a level above said depression and serving to support solid matter, and said pot further comprising a handle outwardly adjacent to the front portion of said bottom wall.

14. As a novel article of manufacture, a chamber pot comprising wall means defining an internal cavity having a rear portion and a front portion with an opening at its upper end, said wall means including an upper portion defining a seat which surrounds said opening for supporting the buttocks of the user in a predetermined position with its rear portion located above said rear portion of said cavity and the front portion located above said front portion of said cavity, and an uneven bottom wall including a front bottom portion located in said front portion of said cavity and defining a depression for reception of liquid matter and a rear bottom portion which is located in said rear portion of said cavity at a level above said depression and serving to support solid matter, and a liner of paper-like material surrounding said cavity at least in the region of the rear portion of said bottom wall.

15. A chamber pot as defined in claim 8, wherein said bottom wall has an underside; said pot further comprising a ground contacting leg of annular shape provided at said underside of said bottom wall.

16. A chamber pot as defined in claim 8, wherein said bottom wall has an underside; said pot further comprising a ground contacting leg of horseshoe shape provided at said underside of said bottom wall.

References Cited

UNITED STATES PATENTS

| | | | |
|---|---|---|---|
| 924,383 | 6/1909 | Schikorra | 4—112 |
| 2,559,027 | 7/1951 | Miralta-Seix | 4—141 |
| 2,591,850 | 4/1952 | Mitchell | 4—112 |
| 2,724,122 | 11/1955 | Tennyson | 4—113 |
| 2,776,071 | 1/1957 | Becker | 220—69 |
| 3,115,281 | 12/1963 | Somme | 220—70 |

FOREIGN PATENTS

| | | |
|---|---|---|
| 29,153 | 12/1909 | Great Britain. |
| 743,656 | 1/1956 | Great Britain. |
| 908,451 | 10/1962 | Great Britain. |
| 302,160 | 12/1917 | Germany. |

LAVERNE D. GEIGER, *Primary Examiner.*

HENRY ARTIS, *Assistant Examiner.*